Sept. 1, 1959     E. R. McCARTER     2,902,657
PULSE MODULATION SYSTEM
Filed Feb. 20, 1956
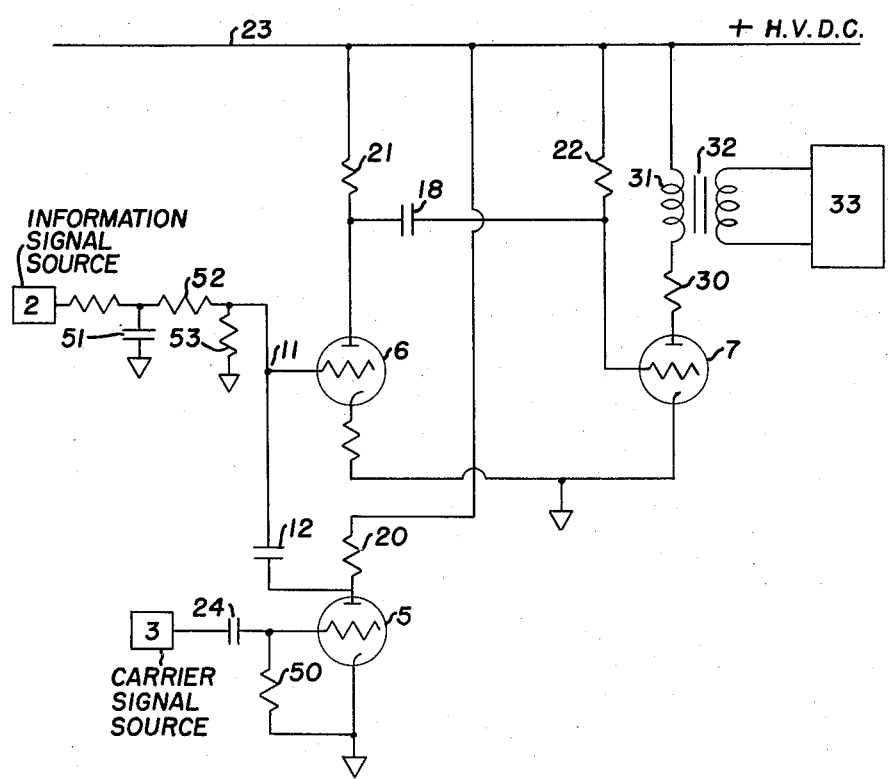
Ed R. McCarter     Inventor
By W. O. Heilman Attorney

United States Patent Office 2,902,657
Patented Sept. 1, 1959

2,902,657

PULSE MODULATION SYSTEM

Ed R. McCarter, Tulsa, Okla., assignor, by mesne assignments, to Jersey Production Research Company Application February 20, 1956, Serial No. 566,547

10 Claims. (Cl. 332—9)

The present invention relates to improved means for modulating a relatively high frequency carrier signal with a relatively low frequency information signal. More specifically, the invention concerns circuitry means for modulating a pulsing electrical signal wherein the width or duration of each pulse is varied in response to the magnitude of the modulating signal. The invention has particular application in the field of seismic prospecting where seismic signals in the form of electrical transients are employed to modulate carrier signals prior to recording.

It is well known in the art of transmitting and handling electrical signals to modulate relatively high frequency carrier signals with relatively low frequency information signals. For example, it is a well-known practice to frequency modulate a relatively high frequency carrier wave with a relatively low frequency information signal. It is likewise well known to vary the duration or width of the individual pulses in a relatively high frequency pulsing signal with a relatively low frequency information signal. This latter procedure is popularly referred to as pulse-width modulation.

As mentioned above, the technique of carrier wave modulation is finding particular application in the field of seismic prospecting where geophone signals are used to modulate carrier signals and the resulting modulated signals are thereafter recorded on suitable record media. Thus, it is substantially conventional practice in the art to record modulated signals of the type just mentioned in the form of oscillographic traces on recording paper, photographic film, etc. or as "phonographic" traces on magnetic tape, magnetic discs, photographic film, etc. The term "phonographic" as used here is intended in the same sense as it is used in U.S. Patent No. 2,051,153, F. T. Rieber, and it includes variable density, variable area and magnetic-type traces.

The use of pulse-width modulation is of particular interest and value in recording seismic signals, since it has been established that this technique greatly minimizes recording noise, especially when the noise is occasioned by variations in the relative speeds of the recording device and the recording medium. Systems that utilize frequency modulation, for example, are much more susceptible to recording noises of this type than are systems that employ pulse width modulation.

It is further desirable in the art of seismic prospecting to have available recording apparatus which is relatively simple in construction and which is easily maintained. It is frequently necessary to employ such apparatus in remote areas, and it is therefore virtually a necessity that the apparatus operate consistently with reliability and accuracy. It is furthermore virtually necessary that the circuitry be kept as simple as possible and that it employ standard electronic components in order to enable operators of the equipment to readily maintain and repair it.

Accordingly, it is an objective of the present invention to provide a system of pulse width modulation which is particularly suitable for use in seismic prospecting operations. It is a further objective of the invention to provide a system which involves the use of standard electronic components that are readily obtained and serviced. It is further a particular objective of the invention to provide a pulse-width modulation circuit which is reliable, accurate, consistent in its performance and which is readily maintained and repaired. These and other related objectives will become more apparent in the description which follows when taken in conjunction with the attached drawing. The drawing illustrates in schematic fashion a preferred embodiment of the invention.

Referring to the drawing, there is illustrated there an embodiment of the invention such as would be particularly suitable for amplifying and modulating one information channel of a multi-channel seismic recorder. Thus, there is indicated an information signal source 2 which in this instance may be a conventional seismic geophone with or without conventional filters, amplifiers and the like. There is also illustrated a carrier signal source 3 which in this instance may be any one of several conventional types of sources—e.g. an unbalanced multivibrator—that are capable of generating electrical pulses having a substantially constant frequency, constant pulse duration or width and constant pulse amplitude.

Also illustrated in the figure are three triodes 5, 6 and 7—the anodes of which are all connected through proper plate impedances 20, 21 and 30, respectively, to the high voltage D.C. source 23.

The pulsing signal from source 3 is conducted via condenser 24 to the grid of triode 5. A suitable resistor 50 is provided as a grid leak in the grid circuit of this triode, and the grid of the triode is normally maintained at a voltage value beyond the cutoff point thereby rendering the triode normally non-conductive.

The pulses that are supplied to the grid of triode 5 are positive in character and sufficient in magnitude to render triode 5 conductive. Therefore, as a result of the pulsing signal on the grid of triode 5, an amplified pulsing signal is developed in the plate circuit of this triode— the degree of amplification being controlled by the characteristics of the tube and the plate resistor 20. The pulses developed in the plate circuit are furthermore preferably clipped by the action of triode 5, and a corresponding plurality or sequence of pulses is transmitted to the grid of triode 6 by the coupling condenser 12 which is provided between the anode of triode 5 and the grid of triode 6. It will be noted that this condenser prevents any D.C. component in the plate circuit of triode 5 from reaching the grid of triode 6.

The information signal from source 2 passes through the low-pass resistor-capacitor combination 51 and resistor 52 to point 11 where it combines with the aforesaid pulsing signal from condenser 12 prior to its application to the grid of triode 6. A suitable grid leak in the form of resistor 53 is provided as shown.

At this point it is well to note that the low-pass filter 51 prevents the high frequency pulsing signal which is coupled by condenser 12 from feeding back to the information signal source 2. Similarly, triode 5 prevents the information signal from freeding over into any other information channels. This is an important provision since, as pointed out earlier, it is conventional in the art of seismic prospecting to employ multi-channel seismic recording systems. The isolation characteristics of triode 5 enables the use of a single carrier signal source with a plurality of information channels.

The combined signal at point 11 consisting of the inverted pulsing signal from condenser 12 and the information signal from source 2 is applied to the grid of triode 6. This triode is preselected to have a cutoff characteristic relative to the voltage characteristics of the information signal and the pulsing signal such that the triode is never driven to cutoff by the former signal but also such that it is always driven to cutoff by the individual pulses of the pulsing signal. It will be appreciated at this point that the information signal is a relatively low frequency signal in comparison with the pulsing signal—the information signal having a frequency no greater than about 50 percent and preferably no greater than about 25 percent of the frequency of the pulsing signal.

As just mentioned above, it is essential in the present invention that the information signal never possess a voltage sufficient to drive triode 6 to cutoff. Triode 6 is thereby continuously conductive until such times as it receives the pulses from condenser 12. These pulses, being negative in character, are always of a magnitude sufficient to drive triode 6 beyond the cutoff point—thereby rendering the triode non-conductive during the duration of each pulse.

As illustrated in the drawing, a condenser 18 is provided in the plate circuit of triode 6 to couple this circuit with the cathode grid path of triode 7. Impedances 21 and 22 are likewise provided, as shown in the figure, in the plate circuit of triode 6 and the grid-cathode path of triode 7 respectively. It is essential that resistor 21 have a relatively much lower impedance than resistor 22 for reasons that will become more apparent in the following description.

The anode of triode 7 is connected via resistor 30 and the primary coil of transformer 32 to the high voltage D.C. source 23. The secondary of transformer 32 is connected as desired, for example, to a suitable recording device 33. A magnetic head, recording pen or the like may be used as the recording device.

Returning for the moment to condenser 18, it will be noted that this component should be of a character to become substantially completely charged during the time interval or period when triode 6 is rendered non-conductive by a pulse from condenser 12. Furthermore, resistor 22 should be preselected such that it discharges condenser 18 down to the voltage level at which triode 7 becomes conductive and during the time period when triode 6 is conductive. Necessarily, triode 7 must be of a character such that it is driven to cutoff by discharge of condenser 18 through resistor 22. The necessity of these structural requirements of the apparatus of the invention will become more apparent in considering the manner in which the invention functions.

In describing the manner in which the invention operates, it will be assumed that an information signal from source 2 is a conventional seismic signal such as is produced by a conventional geophone or other seismic transducer. Thus, it will be particularly assumed that the signal from source 2 has a frequency range of about 5 to 200 cycles per second. With frequencies of this order of magnitude, it has been established that carrier signals having a pulse frequency of about four times the maximum signal frequency and a pulse duration of about one-tenth of the total pulse period are preferred. A pulse frequency of about 800 cycles per second wherein each pulse has a $\frac{1}{8000}$ second duration has been found to be especially effective.

It will further be assumed in initially describing the operation of the invention that the seismic or information signal reaching point 11 from source 2 is zero in value, i.e. that it has a zero voltage. Under these conditions triode 6 is conductive in the absence, of course, of pulses from signal source 3. Triode 7 is likewise conductive at this point, and current flow through primary coil 31 causes current to be supplied to recording device 33. Triode 5 is non-conductive at this time due to the bias on the grid created by condenser 24 and resistor 50.

With the generation of a pulse by carrier signal source 3, the grid of triode 5 is rendered positive to a degree sufficient to render tube 5 conductive. As a result, an amplified pulse signal is generated in the plate circuit of triode 5; and an inverted corresponding pulse is transmitted by coupling condenser 12 to point 11 and thence to the grid of triode 6. The grid of triode 6, being driven beyond the cutoff point by the inverted pulse, causes this triode to become non-conductive. The plate voltage of triode 6 immediately rises to the line voltage of high voltage D.C. source 23 thereby causing condenser 18 to be charged through the low-impedance cathode grid circuit of triode 7.

Condenser 18 remains substantially completely charged and triode 6 remains non-conductive until the cessation of the pulse from source 3. When the pulse ceases, triode 5 again becomes non-conductive and triode 6 again becomes conductive. At this moment triode 7 is driven beyond the cutoff points by the discharge of condenser 18 through resistor 22, and the flow of current through primary coil 31 is interrupted. The current flow through coil 31 remains interrupted until condenser 18 discharges to an extent such that the voltage on grid 11 becomes sufficiently positive to again render this tube conductive. By proper preselection of resistor 22 and condenser 18, the time period for triode 7 to be rendered non-conductive can be regulated to fall anywhere within the time interval between the cessation of one pulse and the beginning of the following pulse. This time interval corresponds to the time interval when triode 6 is conductive. For the purposes of the invention it is preferred that resistor 22 and condenser 18 be preselected such that triode 7 is non-conductive for one-half of the time when the information signal from source 2 has a null value, i.e. zero voltage. Then, as the signal from source 2 tends to become more positive, the period of time during when triode 7 is conductive becomes smaller; and conversely, as the voltage of the signal from source 2 tends to become more negative, the conductive period for triode 7 tends to become greater. Expressed otherwise, the pulses of energy that are transmitted through transformer 32 to recording device 33 are duration modulated by variations in the amplitude of the information signal from source 2.

At this point it will be noted that triode 7 is rendered non-conductive at substantially the same time interval during every pulse from source 3. Thus, the "edge" of the pulse which is transmitted from transformer 32 to recording device 33 every time that triode 7 becomes non-conductive occurs at time intervals corresponding substantially exactly to the frequency of the carrier signal. The other "edge" of each pulse which is transmitted to recording device 33 is governed in its position by the voltage of the information signal at that moment.

It will further be apparent that the embodiment of the invention which is illustrated in the drawing, may be varied somewhat without departing from the spirit or scope of the invention. For example, it will be recognized that triodes 5 and 6, instead of being separate components, may be combined with one another in the form of a dual triode. Similarly, triode 7 may also be one-half of a dual triode, the other half being employed in conjunction with a separate channel of information. In this way, the number of tubes and components in a multichannel recorder can be greatly reduced and simplified.

It is likewise apparent that the characteristics of the various triodes, the resistors, the condensers and the like may be varied with varying conditions. Similarly, the coupling transformer 32 may be replaced as desired by other coupling means; and the signal in the anode circuit of triode 7 may be utilized directly if so desired.

What is claimed is:

1. A system for translating an electrical information signal into a constant frequency pulsing signal in which the duration of the individual pulses is a function of the magnitude of the information signal which comprises, means for mixing said information signal with a constant frequency pulsing carrier signal which has pulses of equal duration and equal amplitude, a first triode, means for applying the mixed signal to the grid of said first triode, said triode being adapted to be conductive in the absence of said carrier pulses and to be cut off by reception of said carrier pulses, a second triode, capacitance means coupling the anode of said first triode with the grid of said second triode and adapted to drive said second triode to cutoff at each instant that said first triode becomes conductive, resistance means cooperative with said capacitance means to render said second triode conductive during each conductive period for said first triode, the anode and cathode of said second triode being free of any feedback connection.

2. A system for modulating a pulsing signal with an information signal which comprises in combination a first triode, a second triode, a condenser coupling the anode of the first triode to the grid of the second triode, the anode and the cathode of the second triode being free of any feedback connection means for generating a pulsing signal in which the pulses occur at a constant frequency and possess substantially equal duration and amplitude, means for mixing the pulsing signal with the information signal, means for applying the resulting mixed signal to the grid of said first triode, said first triode being biased to be cut off by the reception of each said pulse, said condenser being of a character to be completely charged during the cutoff period of said first triode, said condenser also being arranged to discharge down to the cutoff point of said second triode within the conductive time period of said first triode, a transformer, the primary coil of said first transformer being positioned in the anode circuit of said second triode.

3. A system as defined in claim 2 in which the condenser is arranged to discharge to the cutoff value of the second triode within about one-half of the total period of the pulsing signal when the information signal has a zero voltage value.

4. In a system for recording a seismic signal, a system for pulse width modulating the seismic signal which comprises in combination means for generating a pulsing signal wherein the pulses occur at constant frequency and with constant duration and amplitude, means for mixing the pulsing signal with the seismic signal, a first triode, means for applying the mixed signal to the grid of the first triode, said first triode being adapted to be cut off upon reception of each pulse of the pulsing signal, a second triode, a resistance-capacitance time constant circuit, said capacitance coupling the anode of said first triode with the grid-cathode path of said second triode, the anode circuit and the cathode circuit of the second triode being free of any feedback connection, and coupling means in the anode circuit of the second triode adapted to transmit a pulsing signal.

5. A system for translating an oscillating electrical signal into a constant frequency pulsing signal in which the duration of the individual pulses is a function of the magnitude of the information signal which comprises, means for mixing said information signal with a constant frequency pulsing carrier signal which has pulses of constant width and constant amplitude, a first triode, means for applying the mixed signal to the grid of said first triode, said first triode being of a character to be driven to cutoff by the application of each carrier pulse, a second triode, resistance-capacitance delay means coupling the anode circuit of said first triode to the grid-cathode path of the second triode and arranged to drive the second triode to cutoff each time the first triode becomes conductive, said delay means additionally being of a character to render said second triode conductive during a portion of each conductive period of said first triode, and means for withdrawing the resulting pulsing signal from the anode circuit of the second triode, the anode circuit and the cathode circuit of the second triode being free of any feedback connection.

6. A system as defined in claim 5 in which the delay means is arranged to render said second triode conductive for about one-half the total period of the pulsing carrier signal when the information signal has a zero voltage value.

7. A system as defined in claim 5 in which the anode circuit of the second triode is coupled to drive a recording means.

8. A system for translating a seismic signal into a constant frequency pulsing signal in which the duration of the individual pulses is a function of the magnitude of the seismic signal which comprises a first triode, means for generating a constant frequency pulsing carrier signal which has positive pulses of substantially constant width and amplitude, means for applying said carrier signal to the grid of said first triode, a second triode, a first condenser coupling the anode circuit of said first triode to the grid of said second triode thereby transmitting a plurality of inverted pulses having a substantially constant amplitude and width to the grid of said second triode, means for modulating said inverted pulses with said seismic signal prior to application on the grid of said second triode, said second triode being arranged to be driven to cutoff by the reception of each inverted pulse, a third triode, a second condenser coupling the anode circuit of said second triode with the grid-cathode path of said third triode and arranged to drive said third triode to cutoff upon the cessation of each inverted pulse, delay means arranged to render said third triode conductive at a point during each conductive period of said second triode thereby generating a plurality of electrical pulses in the anode circuit of said third triode, the anode circuit and the cathode circuit of said third triode being free of any feedback connection.

9. A pulse-width modulation system comprising two normally conducting multi-element vacuum tubes, each tube including an anode, a cathode, and a grid; means for generating a constant-frequency pulsing signal wherein the pulses have substantially equal duration and amplitude, means for applying the pulsing signal to the grid of a first of said vacuum tubes, said first tube being biased to cut off upon the reception of each pulse, a resistance-capacitance time constant circuit, said capacitance coupling the anode of the first vacuum tube with the grid-cathode path of the second vacuum tube, the anode and the cathode of the second tube being free of any feedback connection, and means for mixing an information signal with the pulsing signal to vary the charge on said capacitance, said resistance being adapted to discharge said capacitance down to the cut-off point of the second triode during each conductive period for the first triode.

10. A pulse-width modulation system comprising first and second multi-element vacuum tubes, each of said tubes being normally conducting and including a cathode, a grid, and an anode; means for generating a constant-frequency pulsing signal wherein the pulses have substantially equal amplitude and duration; means for mixing a seismic signal with the pulsing signal; means for applying the mixed signal to the grid of said first tube, said first tube being biased so as to be cut off by the reception of each pulse; a capacitance coupling the anode of said first tube with the grid-cathode path of said second tube, the anode and the cathode of the second tube being free of any feedback connection; said capacitance being adapted to be substantially completely charged during each non-conductive period of said first tube; a resistance cooperating with said capacitance to discharge the capacitance down to the cut-off point of said second tube during each conductive period of said first tube.

References Cited in the file of this patent

UNITED STATES PATENTS

| 2,432,204 | Miller | Dec. 9, 1947 |
| 2,707,268 | Person | Apr. 26, 1955 |
| 2,789,270 | Finkle et al. | Apr. 16, 1957 |